3,507,127
PURIFICATION OF NITROGEN WHICH CONTAINS METHANE
Salvador S. De Marco, Bartlesville, Okla., assignor to Phillips Petroleum Company, a corporation of Delaware
Filed Dec. 26, 1967, Ser. No. 693,281
Int. Cl. F25j *3/02*
U.S. Cl. 62—28                                                  3 Claims

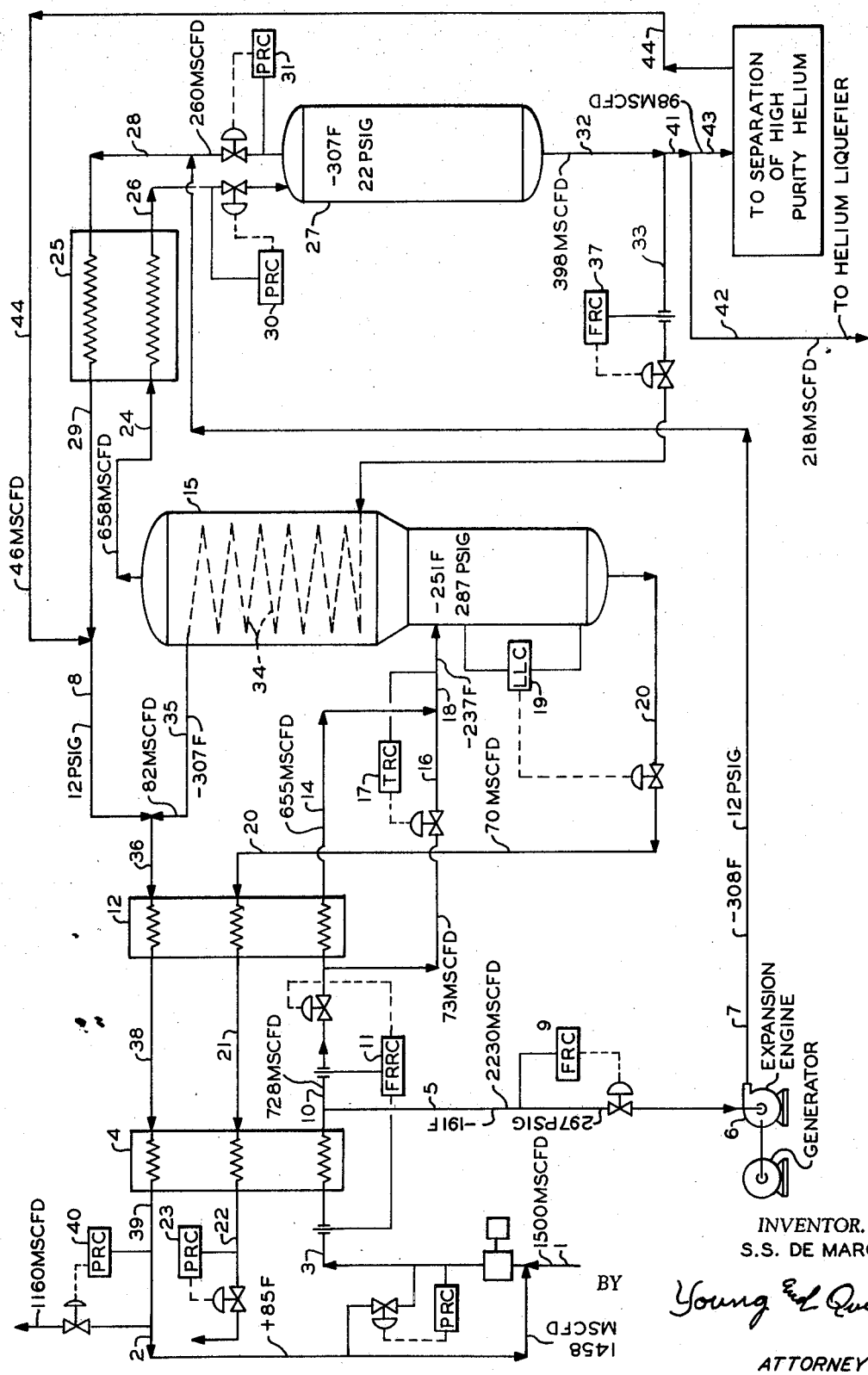

ABSTRACT OF THE DISCLOSURE

In the purification of nitrogen by removing therefrom small amounts of methane in a distillation step, the temperature in the kettle of the distillation step is maintained within a very narrow range in order to avoid formation of methane crystals. Low temperature in the system is maintained by expansion of the compressed nitrogen feed.

---

The invention relates to the purification of nitrogen. In one aspect the invention relates to a method for removing small amounts of methane from nitrogen. In another respect the invention relates to a method for prevention of formation of crystals of methane in removing small amounts of methane from nitrogen by distillation.

In the purification and liquefaction of helium it is desirable to have substantially pure nitrogen for refrigeration. Helium has a negative Joule-Thomson coefficient at ordinary temperatures and therefore it is necessary to pre-cool compressed helium to a very low temperature past the inversion temperature before the helium can be used for further refrigeration. When using nitrogen for the very low temperatures required, the nitrogen must be substantially pure. For example, if the nitrogen contains more than about 0.5 percent methane, trouble is encountered because of crystallization of the methane. It is therefore necessary, in the removal of methane from nitrogen, to control the temperature in the separation zone very closely to prevent crystallization of the methane and at the same time have a temperature low enough to effect a selective condensation of methane without also condensing an excessive amount of nitrogen.

It is an object of the invention to provide a method and means for the purification of nitrogen. It is also an object of this invention to provide a method for maintaining the temperature of the methane-nitrogen mixture in a separation zone at a temperature above the crystallization temperature of the methane and yet below the condensation temperature of the methane. Still another object of the invention is to provide a method for maintaining a balance between the amount of materials fed to the separation zone and the amount of refrigeration used in cooling the feed to the separation zone. Other objects, aspects and advantages of the invention will become apparent to one skilled in the art upon studying the present disclosure including the detailed description of the invention and the drawing wherein.

The sole figure of the drawing represents a schematic flow diagram of a preferred embodiment of the invention.

The invention may be more readily understood by referring to the attached drawing wherein a nitrogen stream, containing about 2 weight percent methane, passes through line 1. This nitrogen stream can be produced in the removal of nitrogen from helium to form substantially pure helium as an example. A recycle stream of substantially pure nitrogen passes through line 2 and into line 1. Nitrogen from line 1 is compressed and passes through line 3 and heat exchanger 4. A portion of the nitrogen from line 3, after passing through heat exchanger 4, is passed through line 5, expansion means 6 which can be, for example, an expansion engine, and thence into line 7 and on into line 28. A flow recording controller 9 can control the rate of flow of nitrogen through line 5. The remainder of the nitrogen stream from heat exchanger 4 passes through line 10 and the rate of flow of nitrogen through line 3 and line 10 can be maintained at a constant ratio by utilizing a flow ratio recording controller indicated at 11. In this case flow recording controller 9 is set to maintain the valve in line 5 wide open. A second portion of the nitrogen from line 10 passes through heat exchanger 12, line 14, line 18, and into fractionator 15. The remainder of the nitrogen from line 10 passes through line 16 and into line 18. A temperature recording controller such as indicated at 17 can be used to control the rate of flow of nitrogen through line 16 so as to maintain a constant temperature of the nitrogen in line 18. Liquid level control 19 controls the rate of flow of liquid through line 20. The liquid from line 20 flows through heat exchanger 12, line 21, heat exchanger 4, and line 22. A pressure recording controller indicated at 23 controls the rate of flow through line 22 and maintains a constant pressure in line 21. The overhead vapors from fractionator 15 pass through line 24, heat exchanger 25, line 26, and to liquid gas separator or flask tank 27. Vapors from separator 27 pass through line 28, heat exchanger 25, line 29, and into line 8. A pressure recording controller indicated at 30 controls the rate of flow of vapor through line 24 and maintains a constant pressure in distillation zone 15. Pressure recording controller 31 controls the rate of flow through line 28 to maintain a constant pressure in separator 27. The liquid from separator 27 flows through line 32 and a portion of the liquid nitrogen from 32 flows through line 33, coils 34, line 35, and into line 36 to form reflux in the vapor space of distillation means 15. The rate of flow through line 33 is controlled by flow recording controller 37. The vapors from line 36 flow through heat exchanger 12, through line 38, heat exchanger 4, and into line 39. Pressure recording controller 40 controls the rate of flow of vapors from line 39 to line 2 and maintains a constant pressure in line 39. A portion of the liquid nitrogen from line 32 flows through line 41. A portion of the nitrogen from line 41 flows through line 42 and is used to liquefy helium, for example. The remainder of the nitrogen from line 41 flows through line 43 and is used for refrigeration in the separation of helium from nitrogen, for example. Nitrogen used for refrigeration in separation of helium from nitrogen can be passed through line 44 and into line 8.

The flow of fluids in the separation of about 1.5 to 2 percent methane from nitrogen to form a 99.5+ percent nitrogen stream is critical. That is, the flow of streams in this separation processes must be closely controlled because the temperature approaches that at which methane will crystallize and it is also necessary that the temperature be low enough to condense the methane in order to remove the methane from the nitrogen. The temperature in the kettle of the distillation zone should be kept, for example, in the range of about −245 to −300° F. The process is particularly sensitive to upsets in this temperature range and therefore it is necessary to maintain the temperature of the stream and the flow rates of the streams as nearly constant as possible in order to avoid undesirable upsets in the process.

The temperatures, pressures and quantities shown in the various streams in the drawing constitute a specific embodiment of the invention, for example a set of typical conditions in the operations of the process.

The process according to the invention operates smoothly without upsets and with the kettle of the distillation zone at a very low temperature without formation of methane crystals.

That which is claimed is:

1. In the purification of nitrogen containing a minor amount of methane by removing the methane as a liquid from gaseous nitrogen in a distillation zone and then cooling and flashing the gaseous nitrogen to liquefy nitrogen, the improvement comprising
    a) compressing the nitrogen to be purified;
    b) cooling a first portion of the compressed nitrogen and passing same to said distillation zone;
    c) introducing a second portion of the compressed nitrogen into said first portion in an amount sufficient to maintain the temperature of said first portion above the crystallization temperature of the methane; and
    d) passing a third portion of the compressed nitrogen through an expansion zone and then into heat exchange with said first portion of compressed nitrogen.

2. The process of claim 1 wherein the overhead vapors from the distillation zone are cooled and flashed to a lower pressure so as to liquefy a portion of the vapors; and a portion of the liquid is passed in indirect heat exchange relationships with the vapors in the distillation zone to provide reflux therein.

3. The process of claim 1 wherein the ratio of flow to nitrogen to the expansion zone to the flow of nitrogen to the distillation zone is maintained constant.

References Cited

UNITED STATES PATENTS

| | | |
|---|---|---|
| 2,677,945 | 5/1954 | Miller. |
| 2,716,332 | 8/1955 | Haynes. |
| 3,218,816 | 11/1965 | Grenier _____ 62—28 |
| 3,274,787 | 9/1966 | Grenier _____ 62—23 |
| 3,323,316 | 6/1967 | Harmens _____ 62—28 |
| 3,348,834 | 10/1967 | Harmens _____ 62—28 |

WILBUR L. BASCOMB, Jr. Primary Examiner

A. F. PURCELL, Assistant Examiner

U.S. Cl. X.R.

62—23, 38